United States Patent [19]

Conklin et al.

[11] 4,082,567
[45] Apr. 4, 1978

[54] METHOD FOR THERMALLY KILLING ROOTS IN SEWER LINES

[75] Inventors: James T. Conklin, Orlando; Daniel R. Daley, Altamonte Springs; Raymond K. Geyer, Orlando, all of Fla.

[73] Assignee: The Carborundum Company, Niagara Falls, N.Y.

[21] Appl. No.: 708,535

[22] Filed: Jul. 26, 1976

[51] Int. Cl.² .......................... B08B 3/10; B08B 9/02
[52] U.S. Cl. ................... 134/10; 134/22 C; 134/24
[58] Field of Search ............... 134/22 C, 24, 166 C, 134/167 C, 168 C, 169 C, 10; 15/104.3 R, 104.12

[56] References Cited

U.S. PATENT DOCUMENTS

| | | | |
|---|---|---|---|
| 2,251,080 | 7/1941 | Taber | 134/22 C |
| 2,976,191 | 3/1961 | Weston | 134/24 |
| 3,171,150 | 3/1965 | Gray | 15/104.12 |
| 3,535,161 | 10/1970 | Gutrich | 134/24 |
| 3,600,225 | 8/1971 | Parmelee | 134/24 X |
| 3,741,807 | 6/1973 | Horne | 134/24 |

Primary Examiner—S. Leon Bashore
Assistant Examiner—Marc L. Caroff
Attorney, Agent, or Firm—Duckworth, Hobby & Allen

[57] ABSTRACT

A heated fluid is used as a thermal herbicide for scalding and killing roots growing within sewer lines. The process includes the steps of heating a fluid, isolating a length of a sewer line, and then filling the isolated length of sewer line with the heated fluid for a lethal period of time required for the heated fluid to act as a thermal herbicide for killing the roots within the length of sewer line. When treating an adjacent length of the sewer line, the preheated fluid is removed from the preceeding section, reheated, and then inserted into the adjacent isolated length of the sewer line.

21 Claims, 1 Drawing Figure

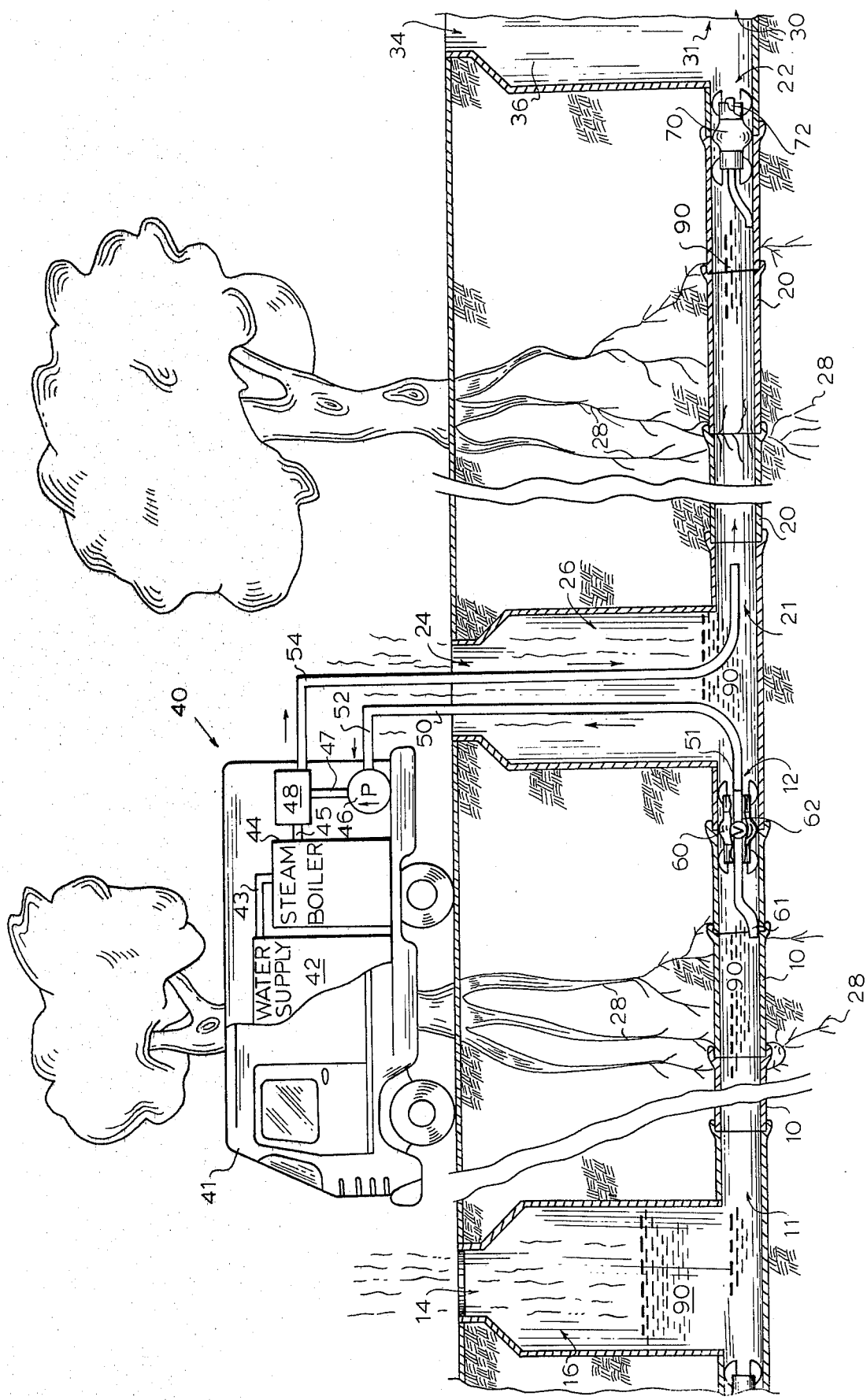

METHOD FOR THERMALLY KILLING ROOTS IN SEWER LINES

BACKGROUND OF THE INVENTION

1. Field of the Invention

This invention relates to a process or method for killing roots and other living material within sewer lines, and in particular to a method for using a heated liquid as a thermal herbicide for killing these roots and living materials.

2. Description of the Prior Art

The growth of roots within sewer lines has long presented a major problem to the proper functioning of a sewage collection system. Roots depending from trees and other vegetation grow faster in a direction toward the moist areas surrounding joints or breaches in sewer line sections. These branches may be due to faults in the material forming the sewer line or due to defective couplings between sewer line sections. In any event, the roots penetrate through the breaches and into the interior cavity of the sewer line. Once inside the sewer line, the roots grow rapidly in order to fully absorb the moisture within the lines. The roots branch profusely causing large clumps or root masses which generally depend from the upper sections of the sewer lines. Root growth generally does not continue below the mean water line since the lack of oxygen within the sewage presents a hostile environment for the roots.

The hair-like roots are gradually covered with layer upon layer of fat or grease which is transported continually through the sewer lines. As the grease coating builds up on each of the hair-like roots, the spaces between the roots are filled. In this manner the net-like structure created by the hair-like roots agglomerates with the grease, thus presenting a substantial obstruction to the passage of sewage through the sewer lines. In extreme cases the accumulation of root growth and grease can completely block the upper sections of the sewer line, thereby inhibiting the sewage flow capacity.

Several different methods have been developed to control the roots within the sewer lines. The first type of method employs a toxic chemical, such as copper sulfate, which is applied directly to the roots within the sewer line. This method is often ineffective since it is difficult to remove the grease and other organic material covering the roots, a preliminary procedure which is necessary to allow the chemicals to penetrate the cutin and suberin layers of the root. These methods may prove dangerous to the environment in that the chemicals may leak from breaches in the sewer line and contaminate the surrounding soil, or in extreme cases an adjacent drinking water supply. Examples of the chemical method are disclosed by Horne in U.S. Pat. Nos. 3,741,807; 3,892,588; and 3,874,926; Weston in U.S. Pat. No. 2,976,191; Tharp in U.S. Pat. No. 2,763,288; Farage in U.S. Pat. No. 3,830,659; Hoff in U.S. Pat. No. 3,403,993; and Otterson in U.S. Pat. No. 1,274,931.

A second method of removing roots from sewer lines employs a mechanical cutter which is rotatably transported in a longitudinal direction through the sewer lines for severing the roots at their point of passage through the breach in the sewer line. These methods are generally unsatisfactory for several reasons. First, in many instances the cutting of the root induces an increased growth rate of the root, thereby exacerbating the problem rather than solving it. Second, the roots are generally soft and will merely bend when forced in communication with the cutting blade. Third, even if the diameter of the rotating blade is increased to communicate with the internal circumferential surface of the sewer line for severing the root adjacent to the breach in the line, the blade often binds within the sewer line. A cutter of this type is disclosed by Gray in U.S. Pat. No. 3,171,150. The Gray rooter apparatus is driven by steam which is expelled from the rotary cutter toward the roots to cauterize the severed root segment.

THE DRAWINGS

Other objects, features and advantages of the present invention will be evident from an examination of the written description and the drawing which illustrates an apparatus in accordance with the present method for recirculating a heated fluid through sequential lengths of a sewer line for killing the roots therein.

SUMMARY OF THE INVENTION

This invention relates to a method for thermally killing roots within sewer lines. The method comprises the steps of heating the fluid, isolating a length of a sewer line from adjacent lengths thereof, and filling the isolated length of sewer line with the heated fluid for a lethal period of time required for the heated fluid to act as a thermal herbicide for killing the roots therein. Adjacent isolated lengths of sewer line may be treated by removing the heated fluid from the preceeding length of sewer line, reheating the fluid, and filling the adjacent isolated length of sewer line with the re-heated fluid for a lethal period of time required for the heated fluid to act as a thermal herbicide for killing the roots therein.

DETAILED DESCRIPTION OF THE PREFERRED EMBODIMENT

The present invention relates to a method for killing roots within a sewer line. With specific reference to the illustration, sewer lines are generally formed from cylindrically shaped pipe sections 10, 20, 30, etc. collinearly arranged and buried beneath the ground. Each of the pipe sections includes a bell shaped collar section at one end for receiving the adjacent end of a similar pipe section. It is common practice in the sewer industry to provide some type of seal between these adjoining sections, such as an O-ring, mortar, asphalt, etc. type seal. However, even if these seals are installed correctly when laying the pipe, the seals may be partially broken when backfilling the trench, or by earth movement, age, newly added access lines, or extreme cyclical variations in temperature, etc. When a breach occurs in the sewer line, such as from a crack in the coupling of adjacent pipes, a sewage effluent flowing through the pipe may escape into the surrounding earth. Furthermore, underground water adjacent to the pipe may also drain through the breach and into the pipe. When many of these breaches in the pipe begin to accept ground water from the surrounding terrain, the unwanted ground water can greatly overload the processing capacity of the sewage treatment system.

Root growth through the breach in the sewer line is accelerated by the growth patterns of the roots, which grow faster toward areas having sufficient moisture content. Thus, the roots will in effect be attracted through the breach in the sewer line by the moisture contained within the sewer line. Once the root structure has penetrated the breach in the line, the roots often expand and grow rapidly to increase the surface area available for moisture absorption. After a period of time the proliferation of the five root structures will grow to a very large mass which may easily obstruct the normal flow of solid material and sewage through the line.

With continuing reference to the drawing, a first longitudinal length of sewer line comprising a plurality of coupling pipes 10 includes a first opening 11 and a second opening 12 at the opposite end thereof. A second length of sewer line comprising a plurality of pipe sections 20 includes a first end 21 and a second end 22. The second end 12 of the first length of sewer line 10 opens into an underground manhole cavity 26 having an exit manhole 24 therein. In a similar manner, the second end 22 of the second length of sewer line 20 opens into another underground manhole cavity 36 having an exit manhole 34 therein. A first end 31 of a third length of sewer line comprising a plurality of sections 30 opens into the manhole cavity 36. A plurality of roots 28 are illustrated as depending from a tree, or other article of surface vegetation, and through breaches in the adjacent pipe sections.

An apparatus in accordance with the present invention is illustrated generally as 40 in the drawing. The apparatus includes a supply of water 42 (or other suitable fluid which is generally non-toxic at ambient temperatures to the roots and other living matter in the sewer line) which is coupled by a pipe 43 to a steam boiler 44. A super-heated steam output of the boiler 44 is coupled by a pipe 45 into an accumulator 48.

A pump 46 is utilized to pump water into the accumulator through a pipe 47. An input conduit 50 includes a second end 52 which is coupled to an input of the pump 46. A first end 51 of the input conduit 50 is coupled to a normally closed throughput 62 in an expandable first plug 60 (or inflatable bladder) placed within the second end 12 of the first length of sewer line 10. The opposite end 61 of the throughput 62 in the first plug 60 couples at a lower level into the first length of sewer line 10. In this manner a fluid 90 within the first length of sewer line 10 is pulled into the throughput 62 of the first plug 60 and through the input conduit 50 by the suction of the pump 46. Both the pump 46 and the input conduit 50 are of sufficient diameter to handle suspended solids up to a maximum of 2 inches in diameter. The output of the pump 46 is coupled through the line 47 to an input of the accumulator 48. The accumulator 48 receives the super-heated steam from the steam boiler 44 and mixes this steam with the fluid 90 from the output of the pump 46. As the steam is mixed with the fluid 90, the fluid temperature increases by an amount determined by the flow rate of the fluid 90 through the pump 46 and the volume and temperature of the steam injected to the accumulator 48.

An output conduit 54 is coupled to an output of the accumulator 48 for transporting the heated fluid 90 into the second length of sewer line 20. The output conduit 54 generally communicates through the manhole 24, into the underground manhole cavity 26 and through the first end 21 of the second length of sewer line 20. An expandable second plug 70 is located at the second end 22 of the second length of sewer line 20 for isolating the second length of sewer line 20 from the third sewer line 30 and the manhole cavity 36. A normally closed throughput conduit 72 is provided in the second plug 70.

The operation of the apparatus 40 in accordance with the present method will now be illustrated with continuing reference to the FIGURE. It will first be assumed that any preliminary cleaning of the sewer line sections 10, 20, 30, if desired, has previously been completed. Sewer cleaners such as the Cobra Cleaner producted by Cues, Inc. of Orlando, Fla. may be utilized to clean the internal surfaces of the sewer lines. Cleaners such as the Cobra model are transported through the sewer line while expelling water under high pressure (800 to 3000 psi) against the inside circumferential walls of the sewer line for removing deposits therefrom. In the case of the Cobra Cleaner, the spraying assembly is self-propelled through the line in one direction and then externally pulled in the reverse direction, thus providing a second cleaning of the inside of the section of sewer line. This cleaning action will remove most of the solid deposits from the inside circumferential surface of the sewer line. The flushing effect of the water utilized by the Cobra Cleaner will also flush the solid material and dirt from the section of sewer line. While it is not necessary to clean the section of sewer line prior to use of the root removing apparatus 40, it is customary to perform all of the sewer maintenance functions on a given section of sewer line within a relatively short period of time.

First, the section of sewer line 20 to be treated is isolated from adjacent sections by inserting the first plug 60 and the second plug 70 into the sewer line generally as shown in the FIGURE.

Next, water from the water supply tank 42 is coupled to the steam boiler 44. The steam produced by the steam boiler 44 is then fed into the accumulator 48. The first end 51 of the input conduit 50 is then coupled to a source of water, such as the water supply tank 42 or a water hydrant (not shown). Since sewage is primarily water, the first end 51 of the input conduit 50 could also be coupled to a preceeding section of sewer line for receiving sewage therefrom, thereby eliminating the requirement for a large external source of water. An upstream water hydrant can be used to supply this water into the sewer. The pump 46 is then actuated for drawing the input water 90 through the input conduit 50, the pump 46, the pipe 47 and into the accumulator 48. Within the accumulator, the steam output from the steam boiler 44 is injected under high pressure into the water 90 flowing from the pump 46. Depending upon the flow rate of water and the pressure and temperature of the steam from the steam boiler 44, the temperature of the water flowing through the accumulator 48 will be increased. The heated water flowing from the accumulator 48 and through the output conduit 54 is then allowed to flow into the second length of sewer line 20 through the first end 21 thereof.

The operation of the pump 46 and the accumulator 48 are adjusted so that the water flowing from the accumulator 48 and through the output conduit 54 will have a temperature of at least 180° F. and preferably 200°–212° F. This heated water 90 will then accumulate within the second length of sewer line 20 which has been isolated by the first plug 60 and the second plug 70. Water is continually pumped through the accumulator 48 and the output conduit 54 until the second length of sewer line 20 is full. The water level will then rise to a desired level within the manhole cavity 26 for inducing a hydrostatic pressure on the water 90 within the second length of sewer line 20. The heated water 90 will then be allowed to remain within the second length of the sewer line 20 for a period of approximately 15 to 60 minutes. The temperature of the water 90 within the second length of sewer line 20 is tested at the second end 22 thereof by drawing water through the throughput 72 of the second plug 70. If the temperature of the water 90 or other fluid therein falls below the desired level, the second plug 70 may be opened to allow the hot water to preheat the adjacent section of line 30. Then additional hot water may be inserted into the second length of sewer line 20 from the accumulator 48 as previously described.

This lethal period of time depends upon the temperature of the water and the condition of roots located within the second section of line 20 and is determined such that the heated water 90 will act as a thermal herbicide for killing the roots within the second length of sewer line 20. This herbicidal action includes several steps. First, the grease which generally covers the roots 28 within the sewer line is liquified and washed away by the combined effect of the preliminary washing of the sewer line and the subsequent flooding of the second section 20 of the line with the hot water. The high temperature of the water 90 within the line will melt and break up the grease together with the bacteria culture which generally grows thereon. Even if the grease coating on the root is not completely dissipated by the action of the hot water, sufficient thermal energy will be transmitted from the water through the grease and into the layers of the root. The rate of heat absorption in the root may be enhanced by increasing the temperature differential between the water and the ambient temperature of the root, and also as a second order effect by increasing the hydrostatic pressure of the water.

As the temperature within the root increases to obtain thermal equilibrium with the surrounding water, there are two distinct kill processes which act independently as thermal herbicides. First, as the temperature in the root increase to 140° F., all of the enzymes within the root are denatured within a short period of time. Without these enzymes the plant cells are no longer self sustaining, thereby causing the death of the root. The lethal period of time required to thermally kill the root by denaturing the enzymes within the root cells is dependent upon the type of root, the thickness of the outer cork layer of the root and the exact temperature achieved within the root. Under normally encountered sewer line conditions and with a water temperature in the range of 180° to 200° F., the lethal period of time required is approximately 15 to 60 minutes for tree roots. After this lethal period of time the denaturing of the cell enzymes in the outer layers of the root is nearly complete, thus killing most of the cells.

A second type of kill process is caused by the heat coagulating the protoplasm in the cell membranes causing breaches therein. These breaches in the cell membrane allow the protoplasm therein to escape. After a period of time following the escape of protoplasm, bacteria and fungus migrate into the cell through these breaches causing a rapid decomposition of the protoplasm. The depth within the root to which this killing process penetrates is largely determined by the temperature differential between the water and the inner layers of the root, together with the period of soaking time. For normal tree roots the aforementioned 15 to 60 minute soaking period will cause a rupturing of the cell membranes within the root to a depth which generally coincides with the depth of the cutin and suberin layers of the root. Rapid decomposition of the external layers of the root can be expected to occur within 7 to 15 days of the thermal treatment.

In addition to the aforementioned killing process, a high temperature differential between the water and the root together with an extended soaking period will enable the heat from the water to be transferred from a section of the root internal to the pipe, through the section of the root communicating through the breach or joint of the pipe and into sections of the root located external to the pipe.

Generally, the cutin and suberin layers of the root will decompose after the aforementioned thermal treatment. However, the xylem layers within the central portion of the larger roots generally will not decompose because of the lignified nature of the xylem. But, in most cases the roots protruding within the sewer line are very thin and are composed predominately of primary tissue. Thus, the large bulk or mass of the fine, hair-like roots will be decomposed by the thermal herbicide action of the water and the subsequent attack by fungus and bacteria.

These thermal killing processes should be contrasted with the commonly used copper sulfate toxic method. First, the rate of migration of the toxin into the root is greatly reduced by the presence of the grease layer and the cork layer on the external sections of the root, whereas the transfer of heat through these layers is not appreciably reduced. Secondly, the toxic effect of the copper sulfate does not produce a breach in the cell membranes which would allow the entry of the bacteria and fungus which assist in the decomposition of the root layers. In fact, the toxic nature of the copper sulfate retards the beneficial growth of the bacteria and fungus just as readily as it kills the root cells. However, the greatest advantage of the thermal herbicide method of killing roots as compared with the copper sulfate method is illustrated by observing the biological effects of the herbicide as it escapes from the sewer line. In the thermal process, the heated water leaves no toxic residues and any water escaping from the sewer line will quickly cool and will be absorbed by the surrounding earth. In contrast, escaping copper sulfate solution can easily migrate into and contaminate water supplies located near the sewer lines.

Considering all of the previously described variables, the preferred thermal herbicide method in accordance with the present invention requires the heating of the circulated water 90 to a temperature in the range of 200°–212° F. This water is then pumped into the isolated section of sewer line 20 to remain for the lethal period of time. Some of the thermal energy in the water 90 will be lost by the transfer of heat through the casing of the sewer line 20. Even in view of these heat losses, the temperature of the water 90 within the sewer line 20 will remain above the critical 140° F. temperature for approximately 60 minutes. This is a sufficient time period to denature the enzymes and coagulate the cell membranes of the external root layers. The large temperature differential during the initial periods of the soaking cycle are especially useful in providing a rapid transfer of the heat energy into the outer layers of the root. Tests have indicated that these water temperatures will not damage sewer lines. In case extended soaking periods are required, temperature measurements of the water within the isolated length of sewer line 20 may be taken at the downstream end 22 through the second plug 70. As the water temperature approaches 140° F., the throughput valve 72 within the second plug 70 may be opened to allow the cooler water 90 to flow downstream for preheating the sequentially adjacent section of sewer line 30. Then, additional water 90 heated to 200°–212° may be inserted into the second section 20 of sewer line for elevating the overall temperature of the water 90 therein. This double step treatment method may be used to special advantage for treating areas of root growth which are particularly resistant to normal thermal treatment.

Returning to the FIGURE, as the heated water 90 is allowed to remain within the second section 20 of the sewer line for the lethal period of time, the apparatus 40 and the mobile vehicle 41 attached thereto may be transported to the next sequential manhole 34 generally downstream from the initial manhole 24. The first end 51 of the input conduit 50 is coupled to the throughput 72 of the second plug 70. A third plug (not shown) then is placed at the second end 32 for isolating the third section of sewer line 30. At the expiration of the required lethal or soaking period required for the heated water 90 within the second length of sewer line 20 to kill the roots, power is applied to the pump 46 for drawing the already heated water and sewage through the throughput section 72 of the second plug 70, the input conduit 50, the pump 46 and into the accumulator 48. The steam produced by the steam boiler 44 is injected into the accumulator 48, thereby increasing the temperature of the water and flowing therethrough. Again, the temperature of the output water from the accumulator 48 is adjusted to approximately 200° F. The fluid output from the accumulator 48 is coupled through the output conduit 54 into the third length of sewer line 30 through the first opening 31. In this manner the additional energy required to again heat the water 90 and sewage to 200° F. will be minimized by utilizing the already preheated fluid within the preceeding section of sewer line 20. Adjacent sections of the sewer line may be isolated and treated by reheating the water and sewage effluent utilized to treat the immediately preceeding section of sewer line. After cleaning several sections of the sewer line it may be necessary to discard part or all of the water due to an accumulation of dirt sewage which have been added to the section of line being cleaned. Also, it may be necessary to reheat and recirculate the fluid through the isolated length of sewer line if a small capacity boiler is used or if unusually long soaking times are required.

Following the treatment of a length of sewer line with the hot fluid, it is highly desirable to ascertain the thoroughness of the root kill. To this end, free floating root sections which have been broken off from the main root stems within the length of sewer line being treated are removed from the sewer line and compressed into a paste. The paste is then diluted in a small amount of the chemical Catechol (pyrocatechin). The combined mixture is then filtered to remove the brown sediment which may be dirt or root.

The Catechol turns from a clear or transparent condition to a brown color in the presence of oxygen if living enzymes are present. Therefore, if the clear mixture remains unclouded and does not turn brown, this indicates that the enzymes within the root samples have been thoroughly denatured. On the other hand, if the solution turns a brownish color, this indicates that the enzymes within the cells of the root samples have not been completely denatured and further treatment is required.

Following the root treatment process, it is generally desirable to perform an inspection of the interior of the sewer line. This may be accomplished by utilizing a television inspection system, such as Model 470 produced by Cues, Inc. of Orlando, Fla. If the inspection team follows closely behind the root treatment team, it is quite likely that the television camera moving within the sewer line will sever some of the depending roots. More importantly, pipe junctions and breaches within the sewer line may then be sealed by utilizing a system such as the Q-Seal produced by Cues, Inc. of Orlando, Fla. This system utilizes a mobile inflatable bladder which excretes a gell through the breaches or openings in the line. This gell then hardens and restores the integrity of the sewer line casing. The operation of the inflatable bladder used in the seal mechanism may sometimes sever the extended portions of the root which come in contact with the bladder.

It should be understood at this point that the present process should not be limited in its application to the construction details illustrated in the embodiments shown in the accompanying drawings. Also, it must be understood that the terminology and descriptions employed herein are used solely for the purpose of describing the preferred method and apparatus and should not be construed as limitations on the operability of the invention.

I claim:

1. A method for using a liquid to kill roots and other living matter in a sewer line, said method comprising the steps of:
   a. heating the liquid external to said sewer line;
   b. isolating a length of the sewer line from adjacent lengths of sewer line;
   c. filling said isolated length of sewer line with said heated liquid at a temperature sufficient to transfer a temperature of at least about 140° F. to all of the natural enzymes of said roots for a lethal period of time, thereby allowing said heated liquid to act as a thermal herbicide for killing the roots and other living matter therein.

2. The method as described in claim 1 further comprising the steps of:
   d. removing said heated liquid from said isolated length of sewer line; and
   e. reheating said liquid.

3. The method as described in claim 2 further comprising the steps of:
   f. isolating one of said adjacent lengths of sewer line; and
   g. filling said isolated adjacent length of sewer line with said reheated liquid for a lethal period of time, thereby allowing said reheated liquid to act as a thermal herbicide for killing the roots and other living matter therein.

4. The method as described in clai 3 wherein the liquid is primarily water.

5. The method as described in claim 1 wherein said filling step further comprises the step of:
   soaking the roots within said isolated length of sewer line for a period of from 15 minutes to 60 minutes with said liquid.

6. The method as described in claim 3, further comprising the steps of:
   releasing from said isolated adjacent length of sewer line a portion of said liquid therein; and
   refilling said isolated adjacent length of sewer line with said reheated liquid.

7. The method as described in claim 2 wherein steps (a) and (e) for heating and reheating the liquid comprise the steps of:

superheating another fluid; and injecting said superheated another fluid into the liquid.

8. The method as described in claim 7 wherein steps (a) and (e) further comprise the step of heating the liquid to a temperature of at least 180° F.

9. The method as described in claim 8 wherein said isolating step comprises the step of temporarily inserting an expandable plug at each end of said isolated adjacent length of sewer line.

10. The method as described in claim 9 wherein said isolated length of sewer line includes at least one manhole entrance.

11. The method as described in claim 1 wherein the liquid is generally non-toxic at ambient temperatures to the roots and other living matter in the sewer line.

12. A method for using a non-toxic liquid to kill roots and other living matter in a sewer line which liquid is substantially non-toxic at ambient temperatures to the roots and other living matter in the sewer line, said process comprising the steps of:
 a. heating the liquid;
 b. isolating a first length of the sewer line from other adjacent lengths thereof;
 c. filling said isolated first length of sewer line with said heated liquid for a lethal period of time required for said heated liquid to act as a thermal herbicide for killing the roots and other living matter therein;
 d. removing said heated liquid from the sewer line;
 e. reheating the liquid;
 f. isolating an adjacent length of said sewer line; and
 g. filling said isolated adjacent length of sewer line with said reheated liquid for a lethal period of time required for said reheated liquid to act as a thermal herbicide for killing the roots and other living matter therein.

13. The method as described in claim 12 wherein step (g) comprises the steps of:
 g1. filling said isolated adjacent length of sewer line with said reheated liquid;
 g2. soaking said isolated adjacent sewer line with said reheated liquid for said lethal time sufficient to thermally kill the roots and other living material therein.

14. The method as described in claim 13 wherein step (g) further comprises the step of:
 g3. maintaining the temperature of said reheated liquid above 140° F. for said lethal period of time.

15. The method as described in claim 14 wherein step (g1) further comprises the step of inducing additional hydrostatic pressure on said reheated liquid within said isolated adjacent length of sewer line.

16. The method as described in claim 14 wherein step (e) comprises the steps of:
 e1. superheating another fluid; and
 e2. injecting said superheated another fluid into the liquid for reheating the liquid.

17. The method as described in claim 16 wherein said liquid comprises sewage removed from a preceeding section of the sewer line.

18. The method as described in claim 17 wherein step (e) further comprises the step of:
 e3. reheating the liquid to a temperature of at least 180° F.

19. The method as described in claim 18 wherein said step (f) comprises the step of temporarily inserting expandable plugs into said adjacent length of sewer line.

20. The method as described in claim 12 further comprising the step of:
 h. repeating steps (d) through (g) for each subsequent length of said sewer line.

21. The method as described in claim 12 further comprising the steps of:
 i. removing root samples from said isolated adjacent length of sewer line after said lethal period of time;
 j. pulverizing the root samples;
 k. mixing a small amount of pyrocatechin with the pulverized root samples;
 l. filtering particulate matter from the mixture; and
 m. observe the color of the mixture after a 5 minute reaction period and if the color remains clear then proceed to repeat steps (d) through (h).

* * * * *